US009691290B2

(12) United States Patent
Reiley et al.

(10) Patent No.: US 9,691,290 B2
(45) Date of Patent: Jun. 27, 2017

(54) SYSTEMS FOR QUANTIFYING CLINICAL SKILL

(71) Applicant: THE JOHNS HOPKINS UNIVERSITY, Baltimore, MD (US)

(72) Inventors: Carol E. Reiley, Baltimore, MD (US); Gregory D. Hager, Baltimore, MD (US); Balakrishnan Varadarajann, Baltimore, MD (US); Sanjeev Pralhad Khudanpur, Baltimore, MD (US); Rajesh Kumar, Baltimore, MD (US); Henry C. Lin, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/877,588

(22) Filed: Oct. 7, 2015

(65) Prior Publication Data

US 2016/0098933 A1    Apr. 7, 2016

Related U.S. Application Data

(63) Continuation of application No. 13/257,517, filed as application No. PCT/US2010/028025 on Mar. 19, 2010, now Pat. No. 9,196,176.

(60) Provisional application No. 61/162,007, filed on Mar. 30, 2009.

(51) Int. Cl.
| G09B 23/28 | (2006.01) |
| A61B 17/00 | (2006.01) |
| G09B 5/00 | (2006.01) |
| G09B 7/00 | (2006.01) |
| G09B 19/00 | (2006.01) |

(52) U.S. Cl.
CPC ............... *G09B 5/00* (2013.01); *G09B 7/00* (2013.01); *G09B 19/00* (2013.01); *G09B 23/28* (2013.01)

(58) Field of Classification Search
CPC ...... G09B 23/28; G09B 23/285; G09B 19/24; A61B 19/2203
USPC .............................................. 434/262; 606/1
See application file for complete search history.

(56) References Cited

U.S. PATENT DOCUMENTS

| 5,682,886 A | 11/1997 | Delp et al. |
| 5,766,016 A | 6/1998 | Sinclair et al. |
| 6,246,200 B1 | 6/2001 | Blumenkranz et al. |
| 6,361,323 B1 | 3/2002 | Beach et al. |

(Continued)

FOREIGN PATENT DOCUMENTS

| CN | 1471061 | 1/2004 |
| CN | 1529880 | 9/2004 |

(Continued)

OTHER PUBLICATIONS

R. A. Fisher, "The Use of Multiple Measurements in Taxonomic Problems", Annals of Human Genetics, vol. 7, No. 2, pp. 179-188 (Sep. 1936).

(Continued)

*Primary Examiner* — Robert J Utama
*Assistant Examiner* — Jerry-Daryl Fletcher
(74) *Attorney, Agent, or Firm* — DLA Piper LLP (US)

(57) ABSTRACT

Systems for quantifying clinical skill of a user, comprising: collecting data relating to a surgical task done by a user using a surgical device; comparing the data for the surgical task to other data for another similar surgical task; quantifying the clinical skill of the user based on the comparing of (Continued)

the data for the surgical task to the other data for the other similar surgical task; outputting the clinical skill of the user.

11 Claims, 14 Drawing Sheets

(56) References Cited

U.S. PATENT DOCUMENTS

| | | | |
|---|---|---|---|
| 6,386,882 | B1 | 5/2002 | Linberg |
| 6,424,885 | B1 | 7/2002 | Niemeyer et al. |
| 6,441,577 | B2 | 8/2002 | Blumenkranz et al. |
| 6,852,107 | B2 | 2/2005 | Wang et al. |
| 6,880,487 | B2 | 4/2005 | Reinkensmeyer et al. |
| 7,155,315 | B2 | 12/2006 | Niemeyer et al. |
| 7,427,200 | B2 | 9/2008 | Noble et al. |
| 8,108,190 | B2 | 1/2012 | Riener et al. |
| 2003/0135203 | A1 | 7/2003 | Wang et al. |
| 2004/0030245 | A1 | 2/2004 | Noble et al. |
| 2004/0254771 | A1 | 12/2004 | Riener et al. |
| 2005/0020409 | A1 | 1/2005 | Hayamizu et al. |
| 2007/0172803 | A1 | 7/2007 | Hannaford et al. |
| 2009/0099576 | A1 | 4/2009 | Wang et al. |
| 2013/0023898 | A9 | 1/2013 | Wang et al. |

FOREIGN PATENT DOCUMENTS

| | | |
|---|---|---|
| CN | 101036585 | 9/2007 |
| CN | 101049248 | 10/2007 |
| CN | 201156345 | 11/2008 |
| JP | 2000-293097 | 10/2000 |
| JP | 2001-216421 | 8/2001 |
| JP | 2002-287613 | 10/2002 |
| JP | 2004-348095 | 12/2004 |
| JP | 2005-0436944 | 2/2005 |
| JP | 2005-515012 | 5/2005 |
| KR | 10-2004-0084243 | 10/2004 |
| KR | 10-0691253 | 3/2007 |

OTHER PUBLICATIONS

Henry C. Lin et al., "Towards Automatic Skill Evaluation: Detection and Segmentation of Robot-Assisted Surgical Motions", Computer Aided Surgery, vol. 11, No. 5, pp. 220-230 (Sep. 2006).
Lawrence R. Rabiner, "A Tutorial on Hidden Markov Models and Selected Applications in Speech Recognition", Proceedings of the IEEE, vol. 77, No. 2, pp. 257-286 (Feb. 1989).
Interntational Search Report issued in International Application No. PCT/US2010/028025, mailed Nov. 17, 2010.
Written Opinion issued in International Application No. PCT/US2010/028025, mailed Nov. 17, 2010.
Interntational Preliminary Report on Patentability issued in International Application No. PCT/US2010/028025, mailed Sep. 20, 2011.
English language abstract of KR 10-2004-0084243, published Oct. 6, 2004.
English language abstact of JP 2000-293097, published Oct. 20, 2000.
Machine English language translation of JP 2000-293097, published Oct. 20, 2000.
English language abstact of JP 2001-216421, published Aug. 10, 2001.
Machine English language translation of JP 2001-216421, published Aug. 10, 2001.
Jacob Rosen et al., "Markov Modeling of Minimally Invasive Surigery based on Tool/Tissue Interaction and Force/Torque Signatures for Evaluating Surgical Skills", IEEE Transactions on Biomedical Engineering, vol. 48, No. 5, pp. 579-591 (May 2001).
Richard K. Reznick et al., "Teaching Surgical Skills—Changes in the Wind", New England Journal of Medicine, vol. 355, No. 25, pp. 2664-2669, Dec. 21, 2006.

Carol J. DeFrances et al,. "2005 Noational Hospital Discharge Survey", Advanced Data from Vital and Health Statics, No. 385, pp. 1-19, Jul. 12, 2007.
Chunliu Zhan et al., "Excess Length of Stay, Charges, and Mortality Attributable to Medical Injuries During Hospitalization", JAMA, vol. 290, No. 14, pp. 1868-1874, Oct. 8, 2003.
Alberto Peracchia, "Surgical Education in the Third Millennium", Annals of Surgery, vol. 234, No. 6, pp. 709-712 (2001).
Ara Darzi et al., "Assessing Operative Skill: Need to Become More Objective", British Medical Journal, vol. 318, pp. 887-888, Apr. 3, 1999.
K. Anders Ericsson, "Deliberate Practice and the Acquisition and Maintenance of Expert Performance in Medicine and Related Domains", Academic Medicine, vol. 79, No. 10 Supplement, pp. S70-S81, Oct. 2004.
Ben Bridgewater et al., "Surgeon Specific Mortality in Adult Cardiac Surgery: Comparison Between Crude and Risk Stratified Data", British Journal of Medicine, vol. 327, pp. 13-17, Jul. 5, 2003.
Krishna Moorthy et al., "Objective Assessment of Technical Skills in Surgery", British Journal of Medicine, vol. 327, pp. 1032-1037, Nov. 1, 2003.
J. Shah et al., "Surgical Skills Assessment: An Ongoing Debate", BJU International, vol. 88, pp. 655-660 (2001).
Jeffrey H. Peters et al., "Development and Validation of a Comprehensive Program of Education and Assessment of the Basic Fundamentals of Laparoscopic Surgery", Surgery, vol. 135, pp. 21-27, Jan. 2004.
Nader K. Francis et al., "The Performance of Master Surgeons on the Advanced Dundee Endoscopic Psychomoto Tester", Arch. Surg. vol. 137, pp. 841-844, Jul. 2002.
H. Xin et al., "Laparoscopic Surgery, Perceptual Limitations and Force: A Review", First Canadian Student Conference on Biomedical Computing, 6 pages (2006).
A.M. Okamura, "Methods for Haptic Feedback in Teleoperated Robot-Assisted Surgery", Ind. Rob., vol. 31, No. 6, pp. 499-508, Dec. 2004.
Zbigniew Nawrat et al., "The Robin Heart Vision, Telemanipulator for Camera Holding13 Preliminary Test Results", Jounral of Automation, Mobile Robotics and Intelligent Systems, vol. 1, No. 1, pp. 48-53, Apr. 2007.
Hermann Mayer et al., "A System for Robotic Heart Surgery that Learns to Tie Knots Using Recurrent Neural Networks", In Proceedings of the International Conference on Intelligent Robotics and Systems (IROS 2006), pp. 543-548 (2006).
C. Richards et al., "Skills Evaluation in Minimally Invasive Surgery Using Force/Torque Signatures", Surg. Endosc., vol. 14, pp. 791-798 (2000).
Jacob Rosen et al., "Generalized Approach for Modeling Minimally Invasive Surgery as a Stochastic Process Using a Discrete Markov Model", IEEE Transactiosn on Biomedical Engineering, vol. 53, No. 3, pp. 399-413, Mar. 2006.
J.A. Ibbotson et al., "Gaze Patterns in Laparoscopic Surgery", Medicine Meets Virtual Reality, vol. 154-160 (1999).
Carla M. Pugh et al., "Development and Validation of Assessment Measures for a Newly Developed Physical Examinatino Simulator", J. Am. Med. Inform. Assoc., vol. 9, pp. 448-460 (2002).
Richard Reznick, Testing Technical Skill Via and Innovative "Bench Station" Examation, The American Journal of Surgery, vol. 173, No. 3, pp. 226-230, Mar. 1997.
Vivek Datta et al., "Relationship Between Skill and Outcome in the Laboratory-Based Model", Surgery, vol. 131, No. 3, pp. 318-323, Mar. 2002.
Gerald M. Fried et al., "Proving the Value of Simulation in Laparoscopic Surgery", Annals of Surgery, vol. 240, No. 3, pp. 518-528, Sep. 2004.
Anthony G. Gallagher et al., "Virtual Reality Simulation for the Operating Room: Proficiency-Based Training as a Paradigm Shift in Surgical Skills Training", Annals of Surgery, vol. 241, No. 2, pp. 364-372, Feb. 2005.
Y. Munz et al., "Laparoscopic Virtual Reality and Box Trainers: Is One Superior to the Other?", Surg. Endosc., vol. 18, pp. 485-494, Feb. 2, 2004.

(56) References Cited

OTHER PUBLICATIONS

Robert O'Toole et al., "Measuring and Developing Suturing Technique with a Virtual Reality Surgical Simulator", J. Am. Coll. Surg., vol. 189, No. 1, pp. 114-127, Jul. 199.

Julian J.H. Leong et al., "HMM Assessment of Quality of Movement Trajectory in Laparoscopic Surgery", MICCAI 2006, LNCS 4190, pp. 752-759 (2006).

Yasushi Yamauchi et al., "Surgical Skill Evaluation by Force Data for Endoscopic Sinus Surgery Training System", MICCAI 2002, LNCS 2488, pp. 44-51 (2002).

Timothy N. Judkins et al., "Objective Evaluation of Expert Performance During Human Robotic Surgical Procedures", J. Robotic Surg., vol. 1, pp. 307-312, Jan. 4, 2008.

Jacob Rosen et al., "Task Decomposition of Laparoscopic Surgery for Object Evaluation of Surgical Residents' Learning Curve Using Hidden Markov Model", Computer Aided Surgery, vol. 7, pp. 49-61 (2002).

Caroline G.L. Cao et al., "Task and Motion Analyses in Endoscopic Surgery", 1996 SME IMECE Conference Proceedings: 5th Annual Symposium on Haptic Interfaces for Virtual Envrionment and Teleoperator Systems, Atlanta, GA, pp. 583-590 (1996).

N. Padoy et al., "A Boosted Segmentation Method for Surgical Workflow Analysis", 10th International Conference on Medical Image Computering and Computer Assidted Intervention—MICCAI 2007, pp. 102-109 (2007).

Neal E. Seymour et al., "Virtual Reality Training Improves Operating Room Performance: Results of a Randomized, Double-Blinded Study", Annals of Surgery, vol. 236, No. 4, pp. 458-464, Oct. 2002.

Aafia Chaudhry et al., "Learning Rate for Laparoscopic Surgical Skills on MIST VR, A Virtual Reality Simulator: Quality of Human-Computer Interface", Ann. R. Coll. Surg. Engl., vol. 81, pp. 281-286 (1999).

C.L. MacKenzie et al., "Hierarchical Decomposition of Laparoscopic Surgery: A Human Factors Approach to Investigating the Operating Room Environment", Min. Invas. Ther. and Allied Technol. vol. 10, No. 3, pp. 121-127 (2001).

Seyed-Ahmad Ahmadi et al., "Recovery of Surgical Workflow Without Explict Models", MICCAI 2006, LNCS 4190, pp. 420-428 (2006).

Thomas Mackel et al., "Application of Hidden Markov Modeling to Objective Medical Skill Evaluation", Stud. Health. Technol. Inform., vol. 135, pp. 316-318 (2007).

C. Sean Hundtofte et al., "Building a Task Language for Segmentation and Recognition of User Input to Cooperative Manipulation Systems", Presented at the 10th International Symposium on Haptic Interfaces for Virtual Environment and Teleoperator Systems 2002, pp. 225-230 (2002).

Todd E. Murphy et al., "Automatic Motion Recognition and Skill Evaluation for Dynamic Tasks", Eurohaptics, pp. 363-373 (2003).

Andrea Castellani et al., "Hybrid HMM/SVM Model for the Analysis and Segmentation of Teleoperation Tasks", Proceedings of the 2004 IEEE International Conference on Robotics and Automation, pp. 2918-2923, Apr. 2004.

Ming Li et al., "Recognition of Operation Motions for Real-Time Assistance Using Virtual Fixtures", Proceedings of the 11th Symposium on Haptic Interfaces for Virtual Environemtn and Teleoperator Systems (HAPTICS'03), pp. 194-1959 (2003).

Matthew D. Shuford, "Robotically Assisted Laparoscopic Radical Prostatectomy: A Brief Review of Outcomes", Proc. Bayl. Univ. med. Cent., vol. 20, No. 4, pp. 354-356, Oct. 2007.

Henry C. Lin et al., "Automatic Detection and Segmentation of Robot-Assisted Surgical Motions", MICCAI 2005, LNCS 3749, pp. 802-810 (2005).

Balakrishnan Varadarajan et al., "Unsupervised Learning of Acoustic Sub-Word Units", Proceedings of ACL-08: HLT, Short Papers (Companion Volume), pp. 165-168,Jun. 2008.

Lawrence R. Rabiner, "A Tutorial on Hiddne Markov Models and Selected Applications in Speech Recognition", Proceeding of the IEEE, vol. 77, No. 2, pp. 257-286, Feb. 1989.

Jie Yang et al., "Hidden Markov Model Approach to Skill Learning and Its Application to Telerobotics", Technical Report, Robotics Institute, Carnegie Mellon University, 36 pages, Jan. 1993.

G.E. Hoveland et al., "Skills Acquisition from Human Demonstration Using a Hidden Markov Model", International Conference on Robotics and Automation, pp. 2706-2711, Apr. 1996.

Wentao Yu et al., "Robotic Therapy for Persons with Disabilities Using Hidden Markov Model Based Skill Learning", International Conference on Robotics and Automation 2004, pp. 2074-2079, (2004).

P. Anderson et al., "Understanding Trends in Inpatient Surgical Volume: Vascular Interventions, 1980-2000", Journal of Vascular Surgery, vol. 39, No. 6, pp. 1200-1208 (2004).

B. Noland Carter, "The Fruition of Halsted's Concept of Surgical Training", Surgery, vol. 32, pp. 518-527 (1952).

Catherine B. Barden et al., "Effects of Limited Work Hours on Surgical Training", J. Am. Col. Surg., vol. 195, No. 4, pp. 531-538, Oct. 2002.

S.D. Bann et al., "Attitudes Towards Skills Examinations for Basic Surgical Trainees", International Journal of Clinical Practice, vol. 59, No. 1, pp. 107-113, Jan. 2005.

J.A. Kopta, "An Approach to the Evaluation of Operative Skills", Surgery, vol. 70, pp. 297-303, Aug. 1971.

Richard K. Reznick, "Teaching and Testing Technical Skills", The American Jornay of Surgery, vol. 165, pp. 358-361, Mar. 1993.

K. Moorthy et al., "Dexterity Enhancement with Robotic Surgery", Surg. Endosc., vol. 18, pp. 790-795 (2004).

M.K. Chmarra et al., "Systems for Tracking Minimally Invasive Surgical Instruments", Minimally Invasive Therapy, vol. 16, No. 6, pp. 328-340 (2007).

S. Riedl, "Modern Operating Room Management in the Workflow of Surgery, Spectrum of Tasks and Challenges of the Future", Anaesthesist, vol. 52, pp. 957-964 (2003).

Patricia L. Figert et al., "Transfer of Training in Acquiring Laparoscopic Skills", J. Am. Coll. Surg., vol. 193, No. 5, pp. 533-537, Nov. 2001.

Karen Moltenbrey, "Commerical Mocap Offerings Track Movements for a Range of Applications", Computer Graphics World, vol. 29, No. 11, Nov. 2006.

Vivek Datta et al., "The Use of Electromagnetic Motion Tracking Analysis to Objectively Measure Open Surgical Skill in Laboratory-Based Model", Journal of the American college of Surgery, vol. 193, No. 5, pp. 479-485 Nov. 2001.

"5DT Data Glove Ulta: Users Manual", Fifth Dimension Technologies, Jan. 2011 (86 pages).

Intrafocus, http://www.intra-focus.com, printed Oct. 8, 2012.

Gary S. Guthart et al., "The Intuitive Telesurgery System: Overview and Application", IEEE International Conference on Robotics and Automation, pp. 618-621, Apr. 2000.

Intuitive Surgical Inc., "Intuitive Surgical Annual Report", Apr. 27, 2007 (110 pages).

Eric Acosta et al., "Dynamic Generation of Surgery Specific Simulators—A Feasibility Study", Medicine Meets Virtual Reality, vol. 13, pp. 1-7 (2005).

N. Taffinder et al., "The Effect of a Second-Generation 3D Endoscope on the Laparoscopic Precision of Novices and Experienced Surgeons", Surg. Endosc., vol. 13, No. 1, pp. 1087-1092 (1999).

N. Taffinder et al., "Rigid Videosigmoidoscopy vs Conventional Sigmoidoscopy: A Randomized Controlled Study", Surg. Endosc., vol. 13, pp. 814-816 (1999).

S. Cotin et al., "Metrics for Laparoscopic Skills Trainers: The Weakest Link!", Medical Image Computing and Computer-Assisted Intervention (MICCAI 2002), vol. 2488, pp. 35-43 (2002).

K.R. Van Sickle et al., "Construct Validation of the ProMIS Simulator Using a Novel Laparoscopic Suturing Task", Surg. Endosc., vol. 19, pp. 1227-1231 (2005).

E. Acosta et al., "Haptic Laparoscopic Skills Trainer with Practical User Evaluation Metrics", Medicine Meets Virtual Reality, vol. 13, pp. 8-11 (2005).

J.D. Hernandez et al., "Qualitative and Quantitative Analysis of the Learning Curve of a Simulated Surgical Task on the Da Vinci System", Surgical Endoscopy, vol. 18, pp. 372-378, Feb. 2, 2004.

(56) References Cited

OTHER PUBLICATIONS

V. Datta et al., "Objective Assessment Comparing Hand-Assisted and Conventional Laparoscopic Surgery", Surg. Endosc., vol. 21, pp. 414-417, Nov. 14, 2006.
Teodor P. Grantcharov et al., "Assessment of Technical Surgical Skills", European Journal of Surgery, vol. 168, pp. 139-144 (2002).
A. Liu et al., "A Survey of Surgical Simulation: Applications, Technology and Education", Presence, vol. 12, pp. 6, pp. 599-614, Dec. 2003.
S.Barry Issenberg et al., "Clinical Skills Training—Practice Makes Perfect", Medical Education, vol. 36, pp. 210-211 (2002).
Hermann Mayer et al., Inverse Kinematics of a manipulator for Minially Invasive Surgery, Technical Report, TUM, Jan. 4, 2004 (18 pages).
Stefanie Speidel et al., "Tracking of Instruments in Minimally Invasive Surgery for Surgical Skill Analysis", Medical Imaging an Augmented Reality, MIAR 2006, LNCS 4091, pp. 148-155 (2006).
Carol E. Reiley et al., "Automatic Recognition of Surgical Motions Using Statistical Modeling for Capturing Variability", MMVR (2008).
D. Kragic et al., "Human-Machine Collaborative Systems for Microsurgical Applications", The International Journal of Robotics Research, vol. 24, No. 9, pp. 731-741, Sep. 2005.
John P. Lenihan, Jr. et al., "What is the Learning Curve for Robotic Assisted Gynecologic Surgery?", Joural of Minimally Invasive Gynecology, vol. 15, No. 5, pp. 589-594, Sep. 2008.
J.A. Martin et al., "Objective Structured Assessment of Technical Skill (OSATS) for Surgical Residents", British Journal of Surgery, vol. 84, pp. 273-278 (1997).
Blake Hannaford et al., "Hidden Markov Model Analysis of Force/Torque Information in Telemanipulation", Int. Journal of Robotics Research, vol. 10, No. 5, pp. 528-539, Oct. 1991.
G. Megali et al., "Modelling and Evaluation of Surgical Performance Using Hidden Markov Models", IEEE Transactiosn on Biomedical Engineering, vol. 53, No. 10, pp. 1911-1919, Oct. 2006.
J.A. Hartigan et al., "A K-Means Clustering Algorithm", Applied Statistics, vol. 8, No. 1, pp. 100-108 (1979).
Office Action issued in Japanese Application No. JP 2012-501005, mailed Jun. 18, 2013.
English language translation of Office Action issued in Japanese Application No. JP 2012-501005, mailed Jun. 18, 2013.
English Language abstract of JP 2002-287613, published Oct. 4, 2002.
English Language translation of JP 2002-287613, published Oct. 4, 2002.
English Language abstract of JP 2005-515012, published May 26, 2005.
English Language translation of JP 2005-515012, published May 26, 2005.
English Language abstract of JP 2004-348095, published Dec. 9, 2004.
English Language translation of JP 2004-348095, published Dec. 9, 2004.
English Language abstract of JP 2005-043644, published Feb. 17, 2005.
English Language translation of JP 2005-043644, published Feb. 17, 2005.
Office Action issued in Chinese Application No. CN 201080013001.X, dated Jun. 8, 2013.
Partial English language translation of Office Action issued in Chinese Application No. CN 201080013001.X, dated Jun. 8, 2013.
English Language abstract of CN 1471061, published Jan. 28, 2004.
English Language abstract of CN 101049248, published Oct. 10, 2007.
Office Action issued in Chinese Application No. CN 201080013001.X, dated Mar. 10, 2014.
Partial English language translation of Office Action issued in Chinese Application No. CN 201080013001.X, dated Mar. 10, 2014.
Office Action issued in Japanese Application No. JP 2012-501005, mailed May 13, 2014.
Office Action issued in Chinese Application No. CN 201080013001.X, dated Nov. 3, 2014.
Partial English language translation of Office Action issued in Chinese Application No. CN 201080013001.X, dated Nov. 3, 2014.
Supplementary European Search Report issued in EP 10754196.3 dated Jan. 29, 2015.
Office Action issued in Chinese Application No. CN 201080013001.X, dated Apr. 13, 2015.
Partial English language translation of Office Action issued in Chinese Application No. CN 201080013001.X, dated Apr. 13, 2015.
English Language abstract of CN 101036585, published Sep. 19, 2007.
English Language abstract of CN 201156345, published Nov. 26, 2008.
English Language abstract of CN 1529880, published Sep. 15, 2004.
Vojtech Franc et al., "Statistical Pattern Recognition Toolbox for Matlab: User's Guide", Center for Machine Perception, Jun. 24, 2004 (99 pages).
R.P.W. Duin, "PRTools, Version 3.2, A Matlab Toolbox for Pattern Recognition", Pattern Recognition Group, Delft University of Technology, Jan. 2003 (39 pages).
David A. Rosenbaum, "Human Motor Control", Academic Press, pp. 197-225 (Copyright 1991).
Office Action issued in European Application No. EP 10754196, dated Aug. 1, 2016.
Office Action issued in Korean Application No. 10-2011-7024589, dated Aug. 11, 2016 (with English language translation).
Office Action issued in Korean Application No. 10-2011-7024589, dated Mar. 30, 2017 (with English language translation).

FIGURE 7

|          | Exp. | Int. | Nov. | count |
|----------|------|------|------|-------|
| Exp. S1  | 0.50 | 0.28 | 0.22 | 18￼ |
| Int. S1  | 0.33 | 0.67 | 0    | 18 |
| Nov. S1  | 0.31 | 0    | 0.69 | 16 |
| Exp. S2  | 0.76 | 0.12 | 0.12 | 76 |
| Int. S2  | 0.16 | 0.78 | 0.06 | 77 |
| Nov. S2  | 0.16 | 0.07 | 0.78 | 76 |
| Exp. S3  | 0.79 | 0.17 | 0.04 | 76 |
| Int. S3  | 0.35 | 0.53 | 0.12 | 75 |
| Nov. S3  | 0.34 | 0.12 | 0.54 | 74 |
| Exp. S4  | 0.89 | 0.02 | 0.09 | 57 |
| Int. S4  | 0.00 | 0.78 | 0.22 | 27 |
| Nov. S4  | 0.03 | 0.14 | 0.83 | 59 |
| Exp. S5  | -    | 0.25 | 0.75 | 4 |
| Int. S5  | 0.11 | 0.79 | 0.11 | 19 |
| Nov. S5  | 0.05 | 0.21 | 0.74 | 19 |
| Exp. S6  | 0.71 | 0.08 | 0.22 | 78 |
| Inter. S6| 0.04 | 0.77 | 0.19 | 74 |
| Nov. S6  | 0.05 | 0.17 | 0.79 | 42 |
| Exp. S7  | -    | -    | -    | 0 |
| Inter. S7| -    | 0.92 | 0.08 | 36 |
| Nov. S7  | -    | 0.07 | 0.93 | 46 |
| Exp. S8  | -    | -    | 1.0  | 2 |
| Int. S8  | -    | 0.76 | 0.24 | 21 |
| Nov. S8  | -    | 0.10 | 0.90 | 21 |

The Data-derived HMM for n = 5 States for Gesture #3

FIGURE 14

Master Telemanipulators (MTMs)

| Label | Data Points | Organization |
|---|---|---|
| Cartesian position | 3 | x, y, z |
| Rotation matrix | 9 | (1,1), (1,2), (1,3), (2,1), (2,2), ..., (3,3) |
| Cartesian velocity | 6 | $x_{vel}$, $y_{vel}$, $z_{vel}$, $X_{rot}$, $Y_{rot}$, $Z_{rot}$ |
| Joint position | 8 | joint 1, joint 2, ..., joint 7, gripper |
| Joint velocity | 8 | joint 1, joint 2, ..., joint 7, gripper |

Patient Side Manipulators (PSMs)

| Label | Data Points | Organization |
|---|---|---|
| Joint position | 7 | joint 1, joint 2, ..., joint 6, gripper |
| Joint velocity | 7 | joint 1, joint 2, ..., joint 6, gripper |
| Cartesian position of RCM | 3 | x, y, z |
| Rotation matrix | 9 | (1,1), (1,2), (1,3), (2,1), (2,2), ..., (3,3) |
| Set-up joint values | 12 | Two values each for joint 1, joint 2, ..., joint 6 |

Other

| Label | Data Points | Organization |
|---|---|---|
| Servo Times | 5 | left master, right master, left slave, right slave, camera slave |
| Console Buttons | 5 | Head in, Master clutch, Camera control, Standby, Ready |

SYSTEMS FOR QUANTIFYING CLINICAL SKILL

This application is a Continuation of U.S. patent application Ser. No. 13/257,517 filed Sep. 19, 2011, which is a National Stage of International Application No. PCT/US2010/028025, filed Mar. 19, 2010, which claims priority to U.S. Provisional Patent Application No. 61/162,007, filed Mar. 20, 2009, entitled "Method for Automatically Evaluating Skill for Motion Training". All of the foregoing are incorporated by reference in their entireties.

This invention was made with government support under 0534359, EEC9731478 and 0205348, awarded by the NSF, as well as an award by the NSF Graduate Research Fellowship Program. The government has certain rights in the invention.

FIELD OF THE INVENTION

The invention is in the field of training, and in one embodiment, surgical training.

BACKGROUND OF THE INVENTION

Virtual training systems have gained increasing acceptance and sophistication in recent years. However, inadequate training can lead to a higher incidence of mistakes. Thus, clinicians desire a more objective method for quantifying clinical technical skill.

Various systems that involve a human-machine interface, including virtual systems, can involve human motions that are random in nature. A person performing a repeatable task multiple times often generates different motion measurements (e.g., forces, velocities, positions, etc.) despite the fact that the measurements represent the same task performed with the same level of skill. Thus, skill modeling should uncover and measure the underlying characteristics of skill hidden in measurable motion data.

One example of such a system that includes a human-machine interface is a teleoperated robotic surgical system, such as the da Vinci® Surgical System commercialized by Intuitive Surgical, Inc. A skilled operator may perform a particular task many times when using a teleoperated robotic surgical system, even though the operator exhibits many small motion characteristic variations among the many task performances. And, an operator with a less proficient skill level will often exhibit motion characteristics when performing the particular task that are significantly different from the skilled operator's motion characteristics for the task.

What is desired is a way to identify how an unskilled or lesser skilled operator's motion characteristics compare with a skilled operator's motion characteristics so that the unskilled or lesser skilled operator's task proficiency can be objectively quantified. What is also desired is a way to provide an objective quantification of an operator's skill level that can be used to help train the operator to perform at a higher skill level. In particular, it is desirable to objectively quantify particular surgical task performances of a surgeon who is learning to use a telerobotic surgical system, and then to use the task performance information to help the surgeon achieve a more proficient performance level.

BRIEF DESCRIPTION OF THE FIGURES

FIGS. 1, 9, and 13-14 illustrate details related to a surgical system for quantifying technical skill, according to several embodiments.

FIGS. 2-8 and 12 illustrate examples of quantifying technical skill, according to multiple embodiments.

DESCRIPTION OF EMBODIMENTS OF THE INVENTION

A system and method are provided for quantifying technical skill. Data can be collected for a surgical task that a user performs. The data can then be compared to other data for the same surgical task. The level of expertise of the user can then be determined based on the comparing, and the clinical skill of the user can be quantified.

In some embodiments, data indicating how a skilled user performs a surgical task can be collected, and this data can be compared to collected data indicating how a second user performs the surgical task so as to determine the second user's clinical skill. In some embodiments, the collected data indicating how a skilled user performs a surgical task can be used to train the second user.

System for Quantifying Technical Skill

Figure 1:
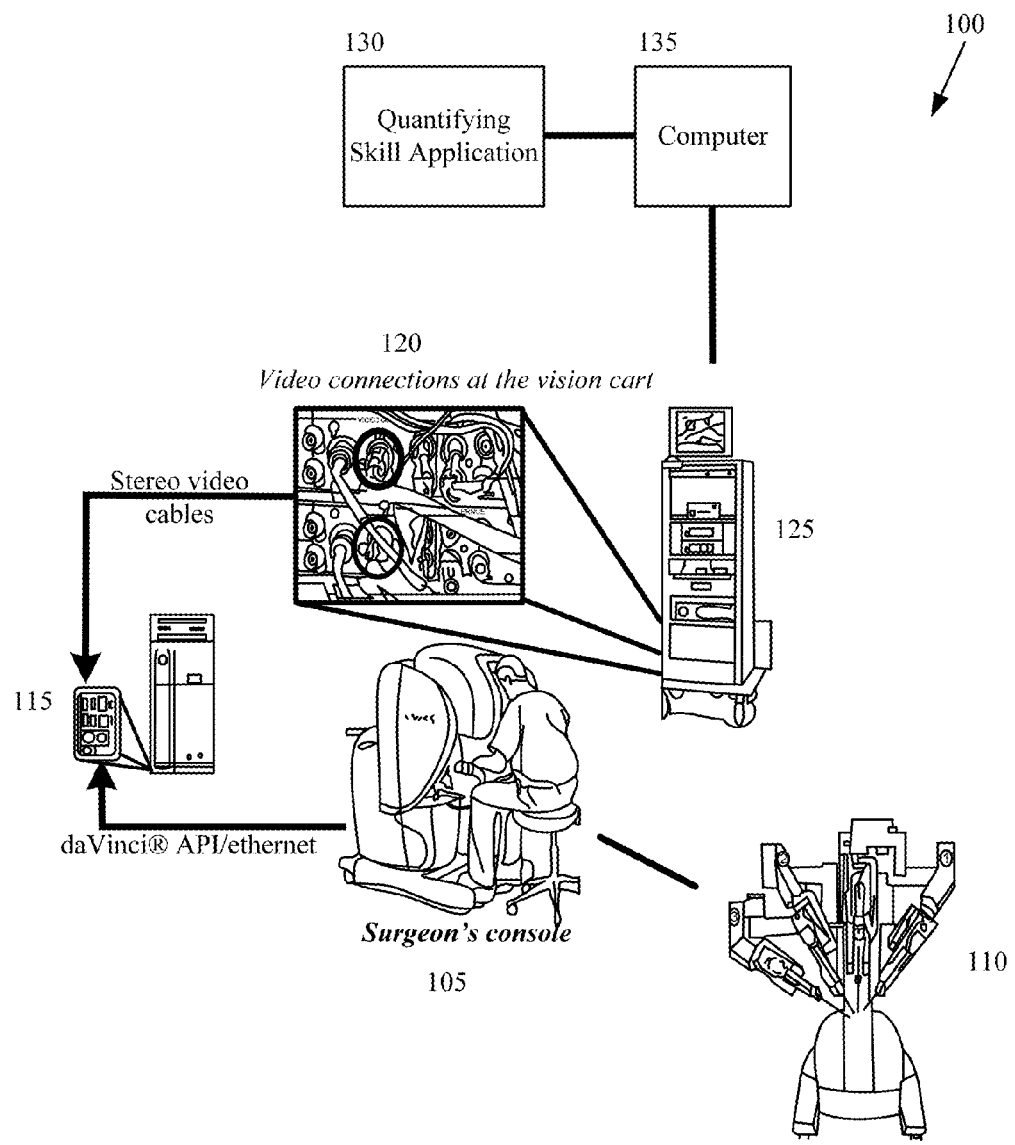

FIG. 1 illustrates a surgical system 100, according to one embodiment. In system 100, data is collected and archived. In one embodiment, the surgical system 100 can be the da Vinci® Surgical System, commercialized by Intuitive Surgical, Inc. Additional information on the da Vinci® Surgical System can be found in, e.g., U.S. Pat. No. 6,441,577 (filed Apr. 3, 2001; disclosing "Manipulator Positioning Linkage for Robotic Surgery") and U.S. Pat. No. 7,155,315 (filed Dec. 12, 2005; disclosing "Camera Referenced Control in a Minimally Invasive Surgical Apparatus), both of which are herein incorporated by reference. Although the da Vinci® Surgical System can be used in one embodiment, those of ordinary skill in the art will see that any surgical system can be used. Those of ordinary skill in the art will also see that there are other ways to collect data, and that embodiments of the invention can be in many fields other than surgery, including but not limited to: rehabilitation, driving, and/or operating machinery.

In one embodiment, the surgical system 100 can include a surgeon's console 105, a vision cart 125, and a patient side cart 110. These main system 100 components may be interconnected in various ways, such as by electrical or optical cabling, or by wireless connections. Electronic data processing necessary to operate system 100 may be centralized in one of the main components, or it may be distributed among two or more of the main components (a reference to an electronic data processor, a computer, or a similar term, therefore, can include one or more actual hardware, firmware, or software components that may be used to produce a particular computational result).

Figure 13:
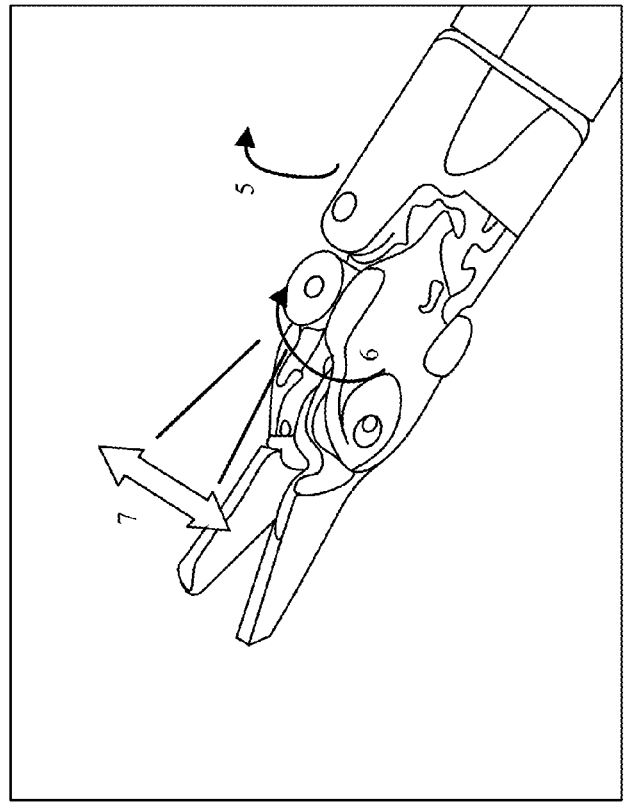
Figure 13:
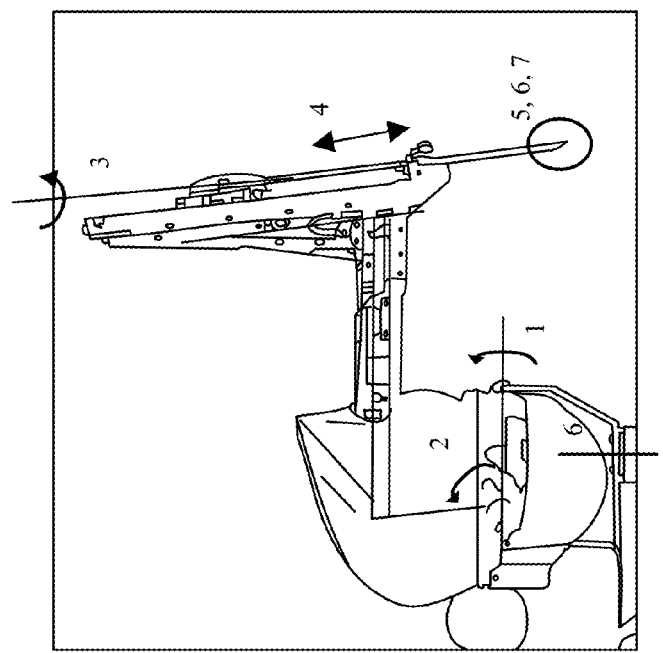

The patient side cart 110 can include one or more robotic manipulators and one or more movable surgical instrument components associated with such manipulators, such as the ones illustrated in FIG. 13. FIG. 13 illustrates various possible kinematic components and their associated movements (e.g., degrees of freedom, which may be variously defined as pitch, yaw, roll, insertion/withdrawal, grip, and the like) and also illustrative joints that may be associated with degrees of freedom for these components. FIG. 14 illustrates possible parameters (data points) relating to these degrees of freedom, as well as other system components (e.g., kinematic parameters such as joint position and velocity, Cartesian position and velocity, rotation matrix values, etc. for the master manipulators; joint position and velocity, Cartesian position of the remote center of motion, rotation matrix values, set up joint values, etc. for the patient side cart; various servo times, button positions, etc., at various places on the system; etc.). These data parameters can be used when measuring a surgeon's movements, which may be characterized by surgeme and dexeme motions that are described in more detail below.

As illustrated by system 100, the surgical system may include an application programming interface (API), which may be accessed via an Ethernet connection on, e.g., an interface 115 on surgeon's console 105 or on another system component. Various system 100 parameters, such as those identified with reference to FIG. 14, may be monitored and recorded (stored, archived, etc.) via the API.

Video data collected by an endoscopic imaging system mounted on patient side cart 110 may be processed through vision cart 125 and output to the surgeon at surgeon's console 105. The video data may be stereoscopic (e.g., left and right eye channels, so as to give the illusion of depth in an apparent three-dimensional (3-D) image) or it may be monoscopic. The video data may be accessed via one or more video output ports in system 100, such as video output connectors located on interface 115. The accessed video data may be recorded, and the video data recording may be synchronized with data output via the API so that system parameters being monitored and video data may be recorded and stored as synchronized with one another.

As shown in FIG. 1, system 100 includes a computer 135, which may be a platform separate from and connected to one or more of the other system 100 components, or which may be integral with one or more of the other system 100 components. A quantifying skill computer application 130 can be stored in a memory to be accessed and executed by computer 135.

Figure 9:
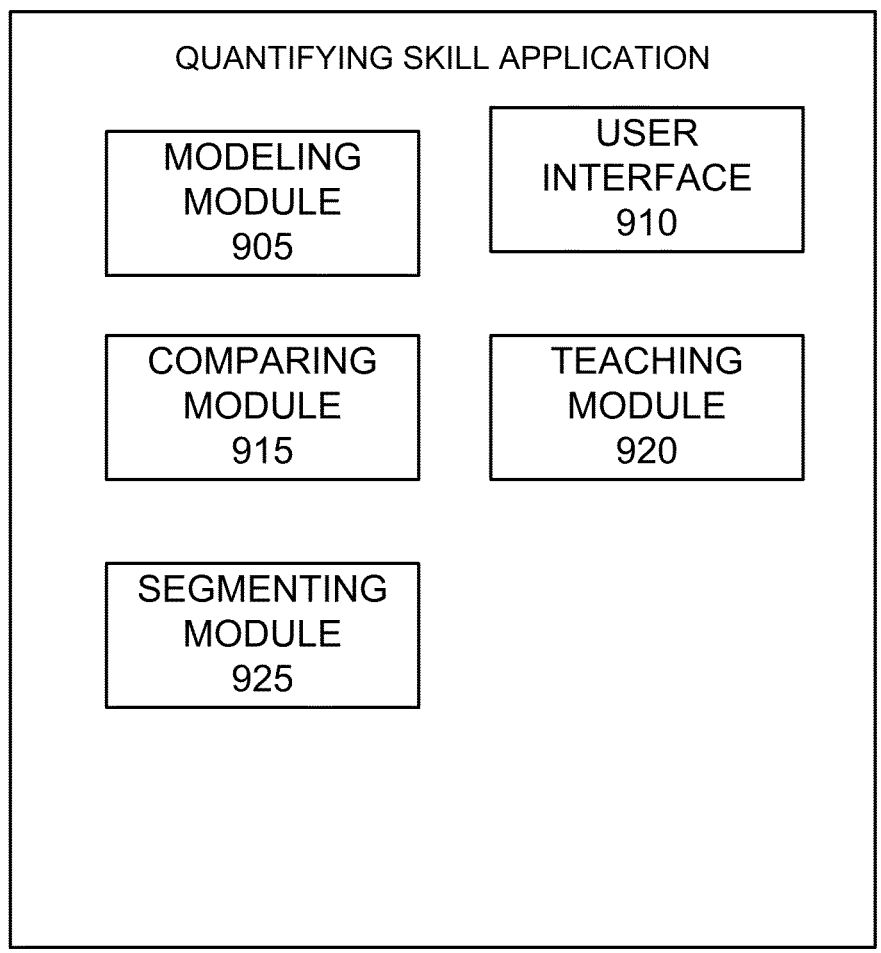

FIG. 9 illustrates details of the quantifying skill computer application 130, which can include a user interface 910, a comparing module 915, a modeling module 905, a teaching module 920, and a segmenting module 925. The user interface 910 can be used to interact with the user. For example, the user interface 910 can display the motions and sub-motions that were tracked for a test, and also indicate which group that text was classified as, as well as disclosing the data behind that classification. The segmenting module 925 can be used to segment data from a procedure into surgemes and dexemes. The formula used to segment the data is described in more detail below. The comparing module 915 can be utilized to compare the data from a test user with data representing expert data, intermediate data, or novice data (or any level of expertise), and determine which level the test user should be designated as, based on the test user's movement data. The modeling module 905 can model movements of a particular skill level (e.g., an expert surgeon). For example, the modeling module 905 can take data that represents movements of an expert user and model those movements. The teaching module 920 can be utilized to teach a user how to do a particular task or sub-task. For example, the teaching module 920 can utilize the data modeling the movements of an expert and use that modeled data to train a user. In some embodiments, the data modeling the movements of an expert can be obtained from the modeling module 905.

Collected data can be encrypted and transferred to an attached portable cartridge (e.g., coupled to computer 135; not shown) using a cartridge drive at the end of a data collection session. Many recorded procedures carried out by one or more persons can be stored on the cartridge. The data from the cartridge can be uploaded to a secure repository (e.g., via a network or internetwork, such as the Internet), or the data from the cartridge drive can be physically sent to another system for storage and/or analysis. Alternatively, the collected data can be transferred from computer 135 directly via network or internetwork to a computer at another location for storage and/or analysis.

An anonymized list of users that use the surgical system 100 can be maintained, and each user can be assigned a unique ID. The collected and archived data can use the unique ID so that the user can be identified only by the unique ID when doing further analysis.

Archived data can be segmented at various granularity levels for a particular trial, task, or procedure. For example, the archived data may be segmented into trial (e.g., procedure level) data, surgeme (e.g., procedure sub-task level) data, or dexeme (e.g., particular motion component of sub-task level) data. These levels of data, and how they are utilized, are described in more detail below.

Archived data can be securely stored. In one embodiment, only users or entities participating in the data collection may access the archived data.

Method for Quantifying Technical Skill

Figure 10:
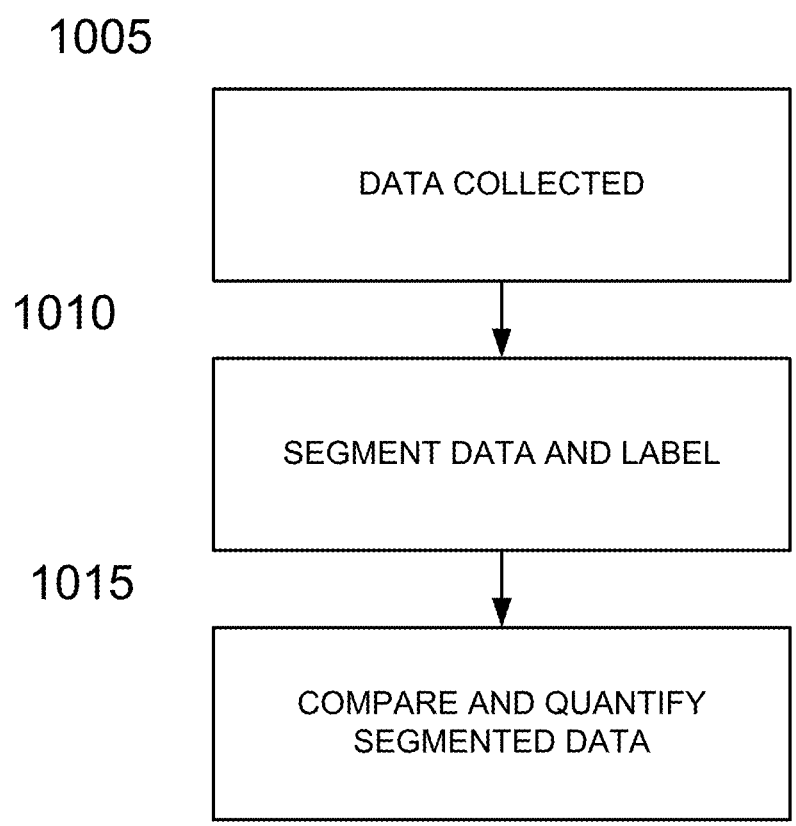
FIGS. 10-11 illustrate a method for quantifying technical skill, according to several embodiments.

FIG. 10 illustrates a method for quantifying technical skill. In 1005, data can be gathered from one or more surgical systems that are used to perform surgical procedures. In one embodiment, a telerobotic surgical system such as the da Vinci® Surgical System can be utilized. In 1010, the data is segmented and labeled. In 1015, the segmented data can be compared to other segmented data and analyzed. The analyzed data can then be utilized to quantify the skill of the users of the surgical system. Details related to these elements are described in more detail below.

Gather Data

Still referring to FIG. 10, in 1005 data can be gathered from one or more surgical systems that one or more surgeons use to perform surgical procedures. Thus, for example, motion data can be gathered from surgeons who have different expertise levels as the surgeons perform surgical tasks using the one or more surgical systems. For example, in one embodiment, a telerobotic surgical system can be used to perform a trial (e.g., procedure) that involves a suturing task (e.g., surgical joining of two surfaces). Data can be collected using the telerobotic surgical system. The data can comprise multiple positions, rotation angles, and velocities of the surgeon console master manipulators and/or the patient side manipulators of the telerobotic surgical system. The gathered data may also include video data collected from the surgical system during the trial or a portion of the trial, as described above.

Segment and/or Label Data

Figure 2:
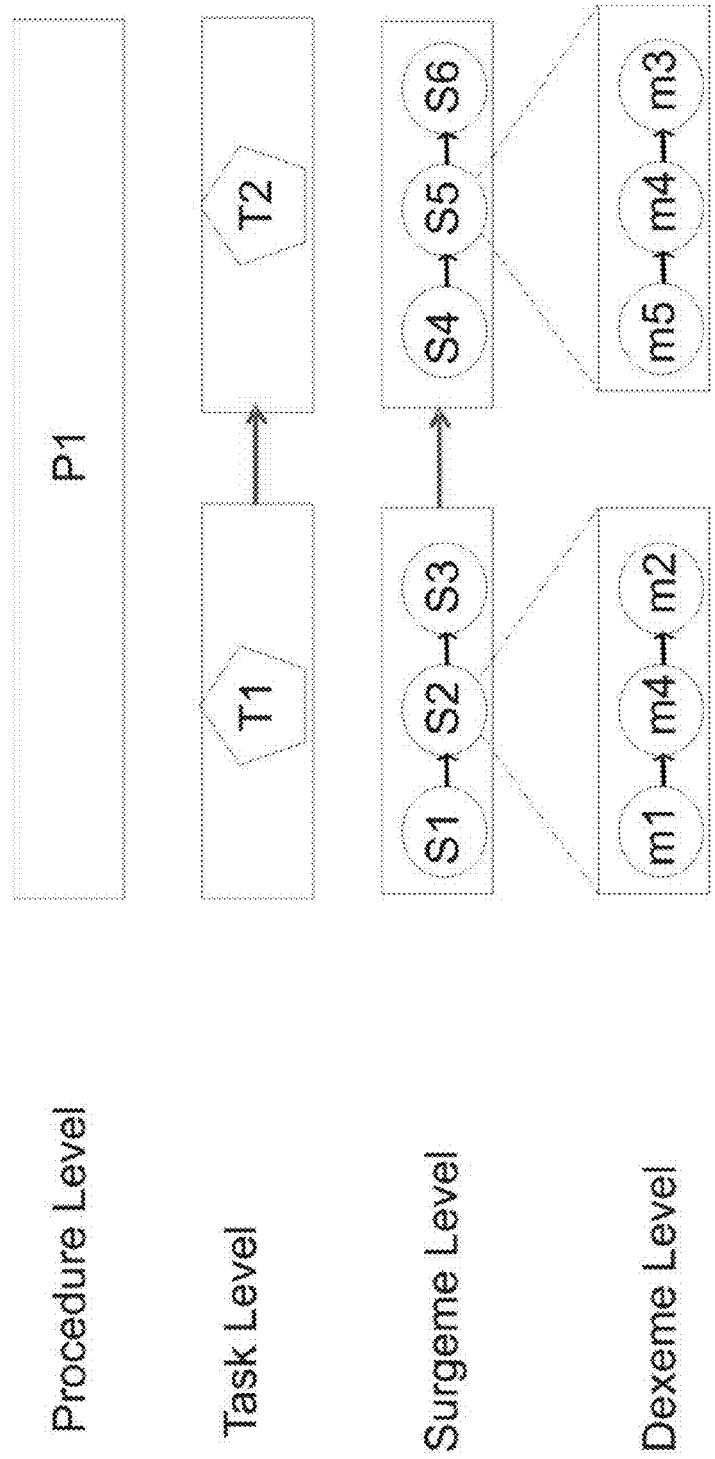

Still referring to FIG. 10, in 1010 the trial data can be segmented and/or labeled. FIG. 2 illustrates various levels that can be used to segment (break up) a procedure, according to one embodiment. As noted above, recorded data can be segmented into trial (e.g., procedure) data, task data, surgeme (e.g., sub-task) data, or dexeme (e.g., motion of sub-task) data. Skill evaluation and training can be done at each level. P1 can be the trial or procedure level (e.g., radical prostatectomy, hysterectomy, mitral valve repair). T1 and T2 are illustrative of various task levels (e.g., suturing), which are tasks that need to be done in the procedure. S1-S6 are illustrative of surgeme levels (e.g., needle pulling), which are sub-tasks needed for a task. As shown in FIG. 2, for example, task T1 is segmented into surgemes S1-S3, and task T2 is segmented into surgemes S4-S6. M1-M6 are illustrative of various dexeme levels, which are motion elements of a sub-task (dexemes represent small dextrous motions). Dexemes can be used to distinguish temporal sub-gestures of a single gesture, as well as stylistic variations between samples of the same gesture. For example, some gestures in a suturing task, such as navigating a needle through the tissue, can be more indicative of expertise than other gestures, such as pulling thread. Such fine grained assessment can lead to better automatic surgical assessment and training. As illustrated in FIG. 2, for example, surgeme S2 is segmented into dexemes M1, M4, and M2, and surgeme S5 is segmented into dexemes M5, M4, and M3. Thus a particular dexeme may be a component of a single surgeme, or it may be a component of two or more surgemes. Likewise, any relatively finer grained segment may be a component of only one or more than one relatively courser grained segment of the next highest level.

Figure 3:
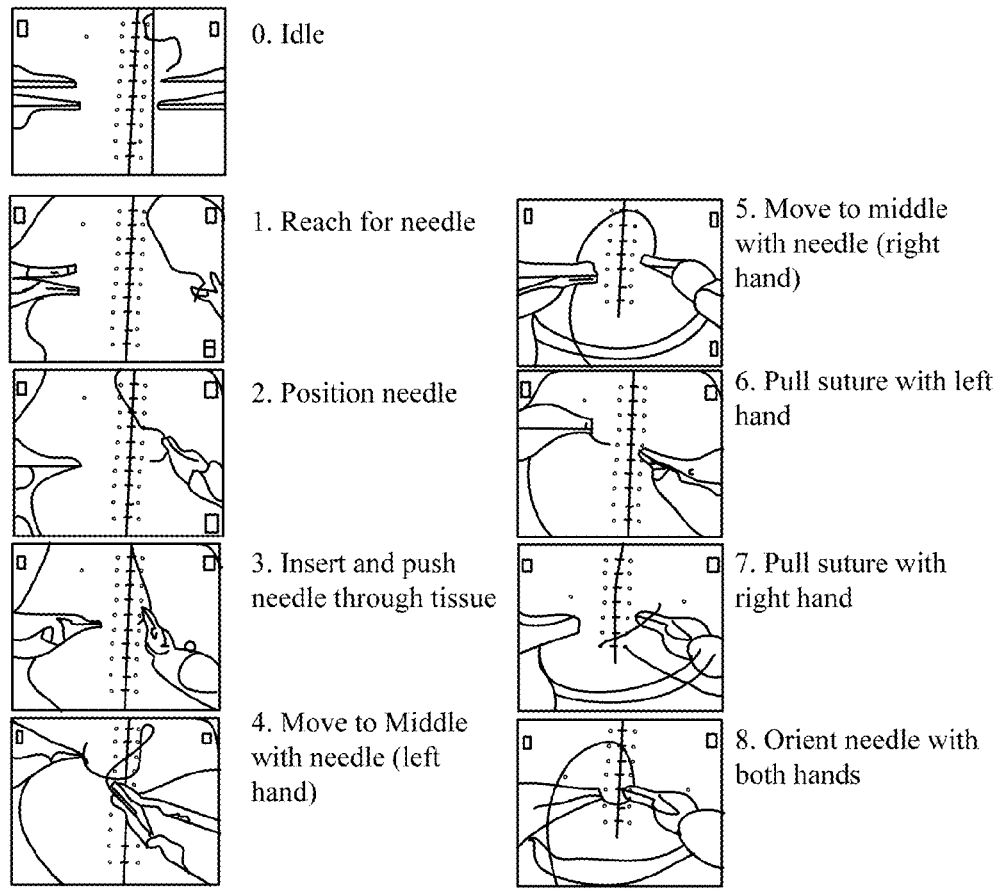

FIG. 3 illustrates how various surgemes can be manually segmented and labeled, according to one embodiment. FIG. 3 illustrates an example of nine surgemes associated with a suturing task (not necessarily in order), with their respective labels. The following motion labels are provided to the nine surgemes: (0) idle position, (1) reach for needle, (2) position needle, (3) insert needle through tissue, (4) transfer needle from left to right hand, (5) move to center with needle in right hand, (6) pull suture with left hand, (7) pull suture with right hand, and (8) orient needle with both hands (the idle state may or may not be considered a surgeme; idle time doing nothing may be a characteristic that is desirable to monitor). In this example, the data is manually segmented and labeled. The surgemes can then be manually segmented into dexemes.

In some embodiments, the data can be automatically segmented into surgemes. The motion data can be automatically segmented by normalizing the data and projecting it to a lower dimension using linear discrimination analysis (LDA). (For more information on LDA, see Fisher, R.: The use of multiple measurements in taxonomic problems. Annals of Eugenics 7 (1936) 179-188.) A Bayes classifier can then decide the most likely surgeme present for each data in the lower dimension based on learned probabilities from training labeled data sets. For more information on how the data can be automatically segmented, see H. Lin et al., "Towards Automatic Skill Evaluation: Detection and Segmentation of Robot-Assisted Surgical Motions", Computer Aided Surgery, September 2006, 11(5): 220-230 (2006), which is herein incorporated by reference.

In one embodiment, this automatic classification can be checked for accuracy. In order to do this, $\{\sigma_{[i]}, i=1, 2, \ldots k\}$ can be used to denote the surgeme label-sequence of a trial, with $\sigma_{[i]}$ in the set $\{1, \ldots, 11\}$ and $k \approx 20$, and $[b_i, e_i]$ the begin and end-time of $\sigma_{[i]}$, $1 \leq b_i < e_i \leq T$. Note that $b_1=1$, $b_i+1=e_i+1$, $e_k=T$. A surgeme transcript $\{\hat{\sigma}_{[i]}, i=1, 2, \ldots, \hat{k}\}$ and time marks $[\hat{b}_i, \hat{e}_i]$ can be assigned to the test trial.

Determining the accuracy of the automatic segmentation $\{y_1, \ldots y_T\}$ as compared to manual segmentation can then be done using the following formula:

$$\text{Accuracy of test trial}\{y_1, \ldots y_T\} = \frac{1}{T}\sum_{t=1} II(\sigma_t = \hat{\sigma}_t)$$

where $\sigma_t = \sigma_{[i]}$ for all $t \in [b_i, e_i]$ and $\hat{\sigma}_t = \hat{\sigma}_{[i]}$ for all $t \in [\hat{b}_i, \hat{e}_i]$.

The surgemes can also be automatically segmented using other methods. For example, in another embodiment, the motion data can be automatically segmented by normalizing the data and projecting it to a lower dimension using linear discrimination analysis (LDA), as described above. Then, the lower dimension data $x_t$ can be plugged in the following formula and run for every possible value for $\sigma$ (which can represent every type of way to segment the lower dimension data).

$$P_\sigma(x_{b_i} = x_{e_i}) = \sum_{s_{b_i} \in S\sigma} \sum_{s_{b_{i+1}} \in S_\sigma} \cdots \sum_{s_{e_i} \in S_\sigma} \prod_{t=b_i} p(S_t | S_{t-1}) N(x_t; \mu_{s_t}, \Sigma_{s_t}), \quad (2)$$

where $S_\sigma$ denotes the hidden states of the model for surgeme $\sigma$, $p(s|s')$ are the transition probabilities between these states, and $N(\bullet; \mu_s, \Sigma_s)$ is a multivariate Gaussian density with mean $\mu_s$ and covariance $\Sigma_s$ associated with state $s \in S_\sigma$.

The value of $\sigma$ that gives the maximum value of P is the segmentation that is used for the surgemes.

The same formula can be used to break up the lower dimension data into dexemes. If we use a Viterbi algorithm to segment the projected kinematic data with respect to the HMM state-sequences, we get a dexeme level segmentation of the data. Such dexeme-level segmentation are valuable for performing dexterity analysis. For more information on Viterbi algorithms, see L. Rabiner, "A Tutorial on Hidden Markov Models and Selected Applications in Speech Recognition", IEEE 77(2) (1989) 257-286.

A discrete HMM can be represented by $\lambda(=A, B, \pi)$, which can include: the state transition probability distribution matrix $A=a_{ij}$, where $a_{ij}$ is the transition probability of a transition from state i to state j; the observation symbol probability distribution matrix $B=b_j(k)$ where $b_j(O_k)=P[o_t=v_k|q_t=j]$ is the output probability of symbol $v_k$ being emitted by state j; and the initial conditions of the system 7E. For more information on HMMs, see L. Rabiner, "A Tutorial on Hidden Markov Models and Selected Applications in Speech Recognition", IEEE 77(2) (1989) 257-286.

Figure 8:
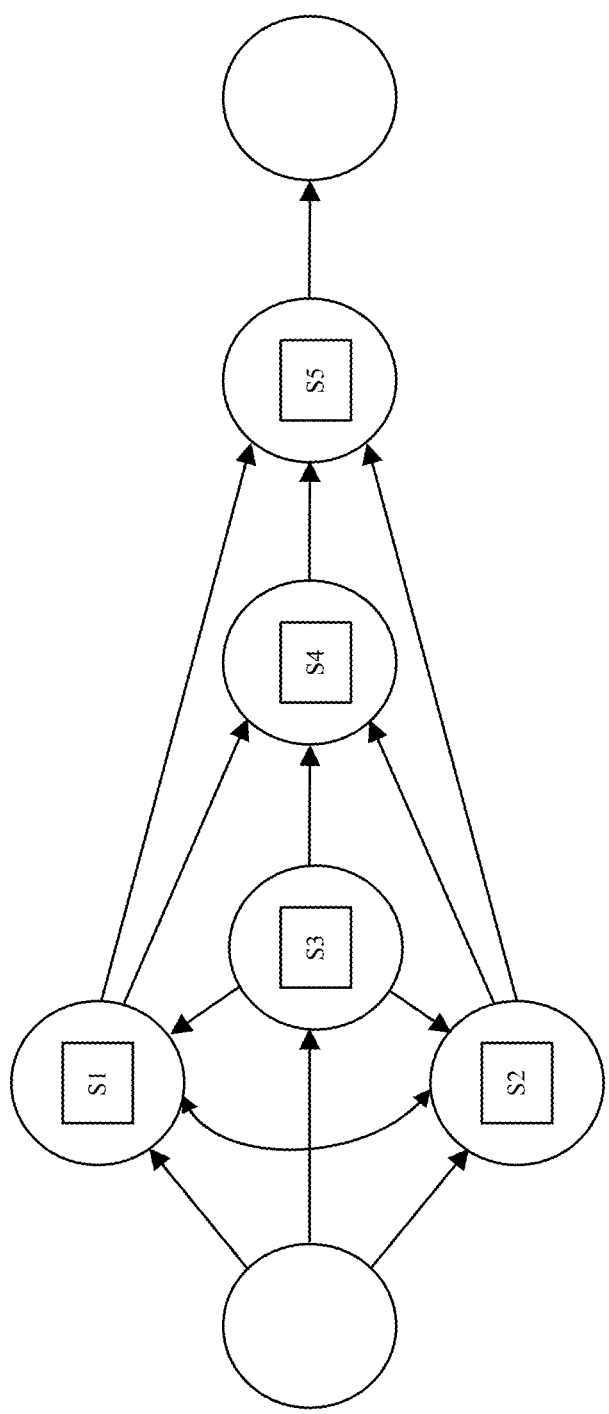

FIG. 8 illustrates a 5 state HMM for a particular surgeme corresponding to the act of "inserting needle through the tissue", according to one embodiment. Individual dexemes corresponding to HMM states a, b, c, d, and e can be isolated. It can then be determined that certain dexemes (e.g., a, b, c) constitute rotating of the right hand patient-side wrist to drive the needle from the entry to the exit. In addition, it can be determined that, for example, the dexeme c movement, which corresponds to a sub-gesture where the surgeon hesitates/retracts while pushing the needle to the exit point, was from mostly novice surgeons.

Compare Data and Quantify Clinical Skill

Referring back to FIG. 10, in 1015, after the trial is segmented and/or labeled, clinical skill can be quantified by making comparisons between data.

The segmented data produced in accordance with 1010 in FIG. 10 can be used to identify the most likely skill model to have produced certain segmented data. For example, once the data has been segmented into a sequence of surgemes or dexemes, this sequence $O_{test}$ can be compared to various skill level models $\lambda_e$ (expert), $\lambda_i$ (intermediate), and $\lambda_n$ (novice). The skill level of the test data $\lambda_{test}$ can be labeled expert, intermediate or novice based on which skill level is closest to the test data, based on the following distance formula:

$$D(\lambda_s, \lambda_{test}) = \frac{1}{T_{test}}\min(\xi(\lambda_i, \lambda_{test}), \xi(\lambda_e, \lambda_{test}), \xi(\lambda_n, \lambda_{test}))$$

-continued where:

$$\xi(\lambda_s, \lambda_{test}) = \log P(O_{test} | \lambda_{Test}) - \log P(O_{test} | \lambda_s)$$

and $\lambda_s$ is the skill model, and $T_{test}$ is the length of the observation sequence $O_{test}$.

It should be noted that the motion labels can be used to explore appropriate ways for evaluating the skill of the motions. In addition, the time per task (including the time per surgeme and dexeme) can be compared. In some embodiments, idle motion time at the start and end of the trial (motion (0)) does not need to be used for data analysis. The motions, the timing of the motions, and the sequence of motions executed by the user can be used to make conclusions about the relative skill of a user that is performing each trial.

Figure 4:
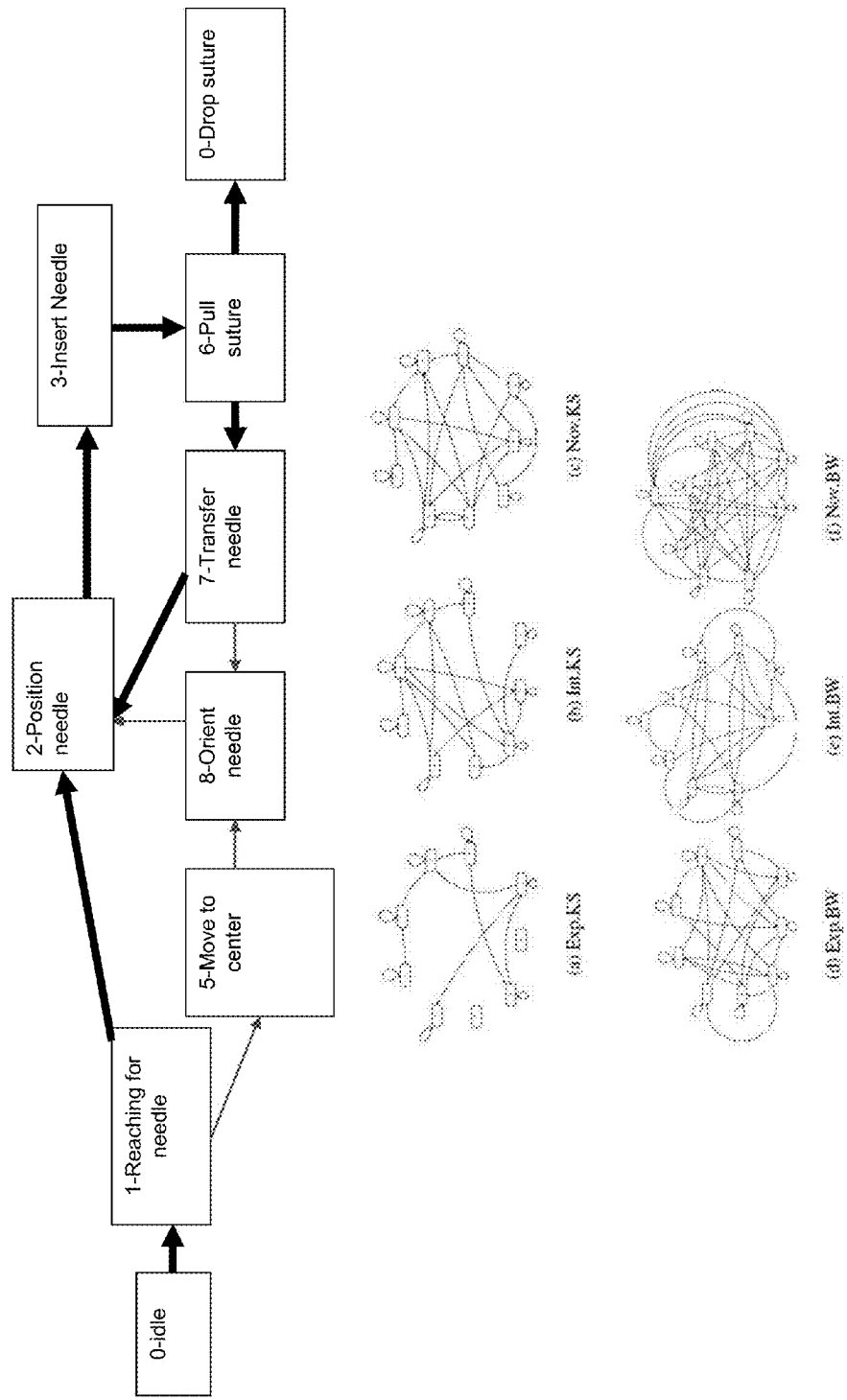

For example, FIG. 4 illustrates the difference between the movements of experts, intermediates, and novice surgeons. As the surgeon's skill increases, the graph of his or her movements shows that the movements become more directed. In this example, the expert surgeon (shown as graphs (a) and (d)) accomplishes a task using fewer movements, whereas the novice surgeon (shown as graphs (c) and (f)) made more errors during the task and thus used extraneous motions and started over. FIG. 4 also illustrates that an idle surgeme during a task may represent an error (e.g., dropping a needle), and so may be significant to a skill level analysis. Thus an otherwise substantially similar surgeme may be assigned a separate label, or it may be identified as significant because of its position in a sequence of surgemes.

Figure 5:
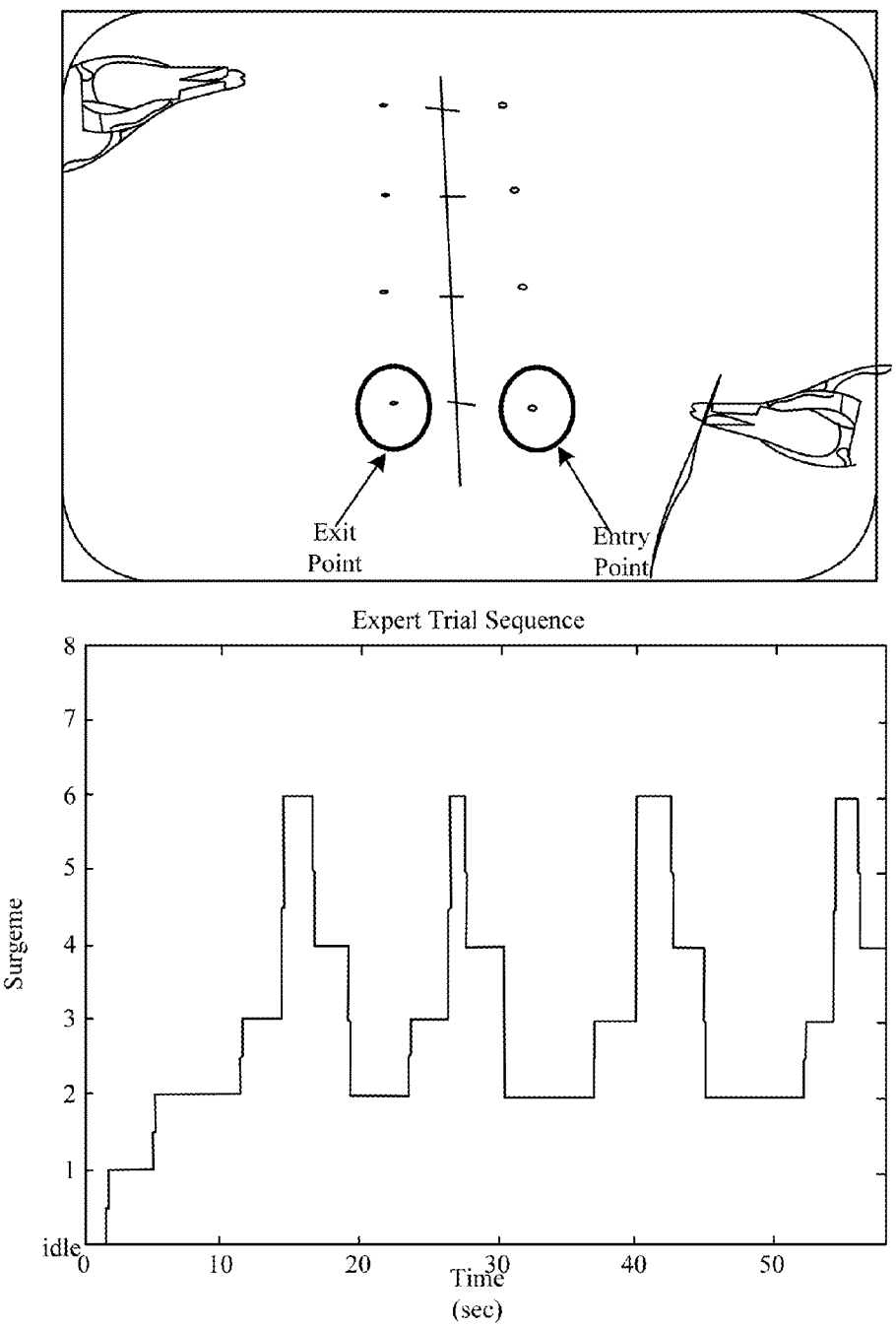

FIG. 5 illustrates typical transitions between surgemes during a sample trial. The transitions between surgemes reveals immediate differences in the approach taken between experts and novices. Experts can use one particular pattern of motions repeatedly throughout the task. Consequently, users who have a relatively higher skill level can create more directed transition graphs than users who have a relatively lower skill level. For example, after pushing the needle through simulated tissue from the target entry point to the target exit point, as shown in the top portion of FIG. 5, an expert's trials can show the suture is pulled taut with the left tool, and then the needle is handled to the right tool for another round of positioning and insertion (this sequence is represented as surgemes 6, 4, 2, 3 in the bottom portion of FIG. 5). In contrast, a less experienced surgeon's trials can show the suture occasionally being pulled a portion of the way with the left tool with the right tool then used to pull the suture taut (this sequence is represented as surgemes 6, 7, 2, 3 (not shown)). In addition, FIG. 5 illustrates that the duration of a sequence of one or more surgemes can be measured. In one instance in which simulated tissue was used, the average time for surgemes 4, 6, and 7 on a per-trial basis for experts was 13.34 seconds. This same statistic for intermediates and novices were 20.11 and 16.48 seconds, respectively. It thus can be concluded that choosing to pull the suture in two steps was less time-efficient. Additionally, it can be shown that by choosing to pull the suture to the right across the wound with the right instrument, intermediate and novice surgeons place undue stress on the tissue that ought to be avoided.

Furthermore, different analytical performance metrics, and time and number of motions, can also reveal differences between the three expertise level groups. The expert group can show an average of 56.2 seconds to complete the task, while intermediates can use an average of 77.4 seconds, and novices can complete the task in an average of 82.5 seconds. Thus, there is a correlation between time and the number of surgemes used in a trial. The average number of surgemes used to complete the task were 19, 21, and 20 for experts, intermediates, and novices, respectively.

Figure 6:
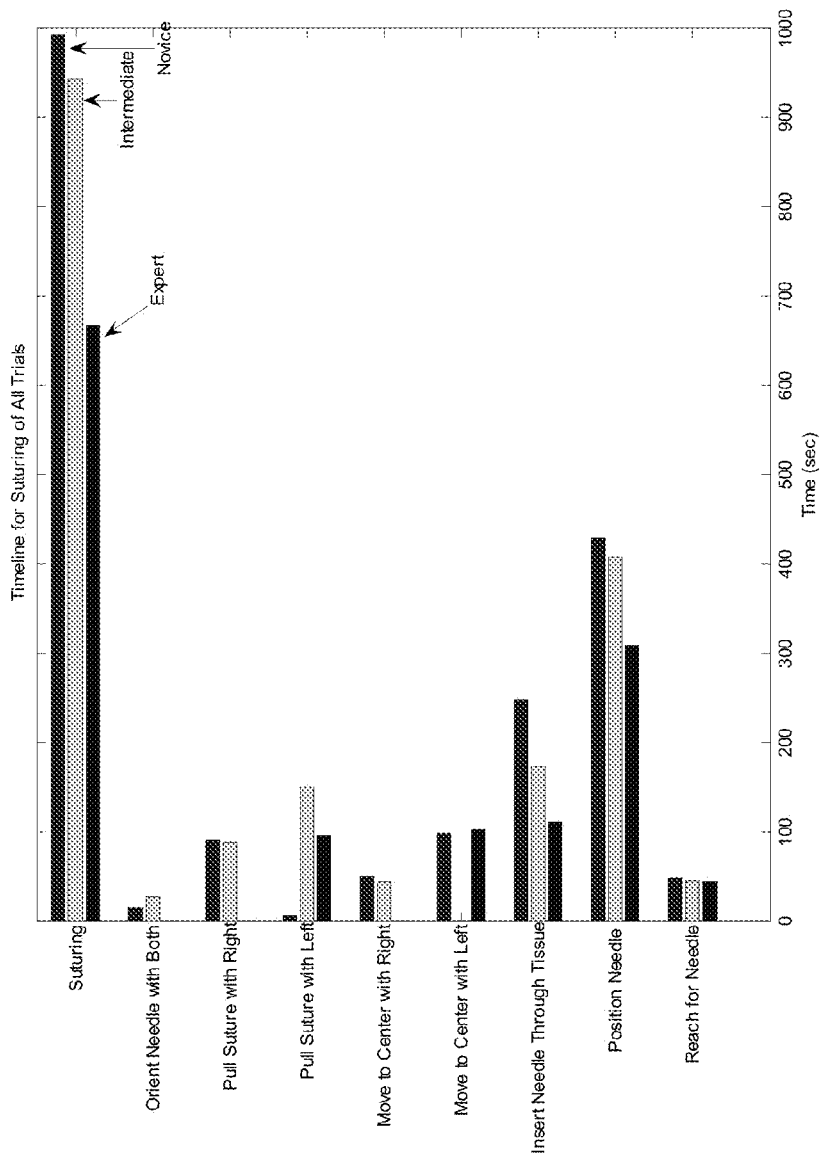

By decomposing the time spent per surgeme, observations can be made, such as: (1) experts performed certain surgemes more efficiently than novices, and (2) experts did not use certain surgemes. FIG. 6 illustrates an embodiment in which the time for various surgeme motions is analyzed. For example, less experienced surgeons typically spent more time positioning and inserting the needle (surgeme motions 2 and 3, respectively) than experts, particularly to guide the needle tip to emerge through the marked exit point. In one case, manual analysis revealed that experts spent a per-trial average of 28.04 seconds using motions 2 and 3 collectively, intermediates 48.51 seconds, and novices 56.59 seconds. As shown in FIG. 6, another indicator of skill was that experts hardly used intermediate positioning surgemes, such as motion 5 (move to center with right hand), motion 7 (pulling suture with right hand), and motion 8 (orienting the needle with both tools), which are shown by the bottom bars associated with each surgeme in FIG. 6. When retrieving the needle from the starting position and when handing the needle from one tool to the other between suture throws, expert surgeons were able to grasp the needle in an orientation that did not need readjusting (i.e., no surgeme motion 8 was indicated for any expert). Intermediates used this two hand orienting motion surgeme twelve times and required fewer motions to complete a task more quickly than surgeons with even less skill. Such economy of motion is often subjectively gauged for surgical skill evaluation, and it is now objectively shown in accordance with the analysis embodiment illustrated in FIG. 6.

FIG. 7 illustrates an example embodiment analysis of isolated surgeme classification systems that have been correctly identified. FIG. 7 sets forth eight surgemes, and how they were classified, and how that classification compared to training classifications. Reading across the rows indicates how many times each surgeme motion was correctly recognized and how many times it was mistaken for another skill level. For example, expert surgeme 1 was correctly recognized 8 times and mistaken for intermediate 2 times and novice 2 times. In particular, with respect to surgeme 1, the expert level for surgeme 1 was correctly classified as an expert level 50% of the time, incorrectly classified as an intermediate level 28% of the time, and incorrectly classified as a novice level 22% of the time. Similarly, the intermediate level for surgeme 1 was correctly classified as an intermediate level 67% of the time, incorrectly classified as an expert level 33% of the time, and incorrectly classified as a novice level 0% of the time. Finally, the novice level for surgeme 1 was correctly classified as a novice level 69% of the time, incorrectly classified as an expert level 31% of the time, and incorrectly classified as an intermediate level 0% of the time.

Note that in FIG. 7, there are no models for surgeme motion 5, 7, and 8 of an expert, and no models for surgeme motion 4 of an intermediate, because in this example, these surgeme motions were never used by these expertise groups. In the example in FIG. 7, there were higher recognition rates for surgemes where experts performed more efficiently than novices (surgemes 2, 3, 4) than surgemes that experts did not use (surgemes 5, 7, 8). For the surgemes that experts did not use, intermediates and novices were commonly misclassified with each other, suggesting that they performed these surgemes very similarly. Surgemes 1 (66.8% overall; 67% expert; 75% intermediate; 50% novice) and 6 (66.8% overall; 65% expert; 92% intermediate; 50% novice) were difficult to classify correctly, indicating that certain surgemes are not as discriminative of skill as others.

Figure 12:
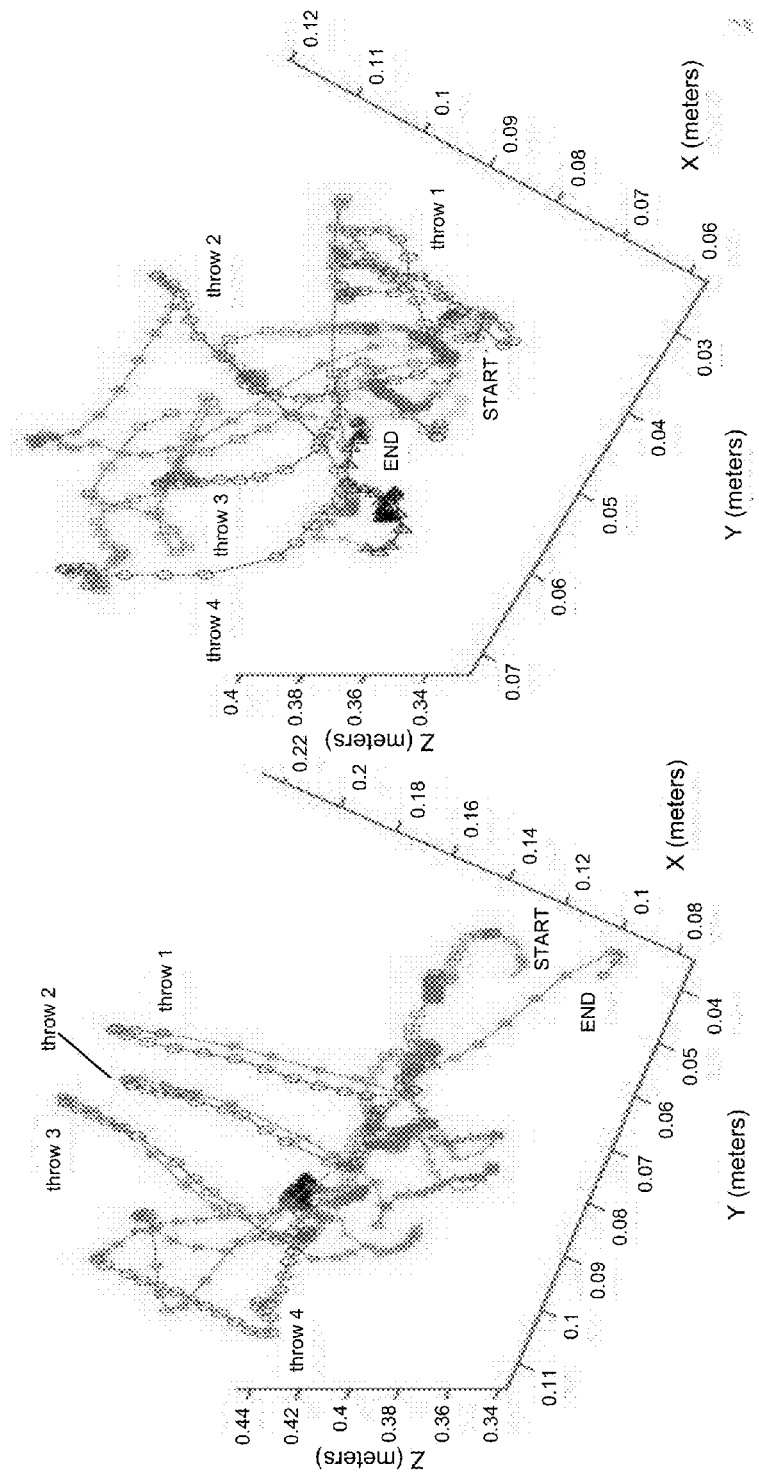

As an additional example of an analysis embodiment, the left side portion of FIG. 12 illustrates the Cartesian positions of the right hand of an expert performing a four-throw suturing task, and the right side portion of FIG. 12 illustrates the Cartesian positions of the right hand of a novice performing the same four-throw suturing task. Various colors and/or marks along the position lines may be associated with the various surgemes each surgeon used during the task. This figure graphically illustrates the many differences in movement between a surgeon with an expert skill level and a surgeon with a novice skill level.

Teaching

Figure 11:
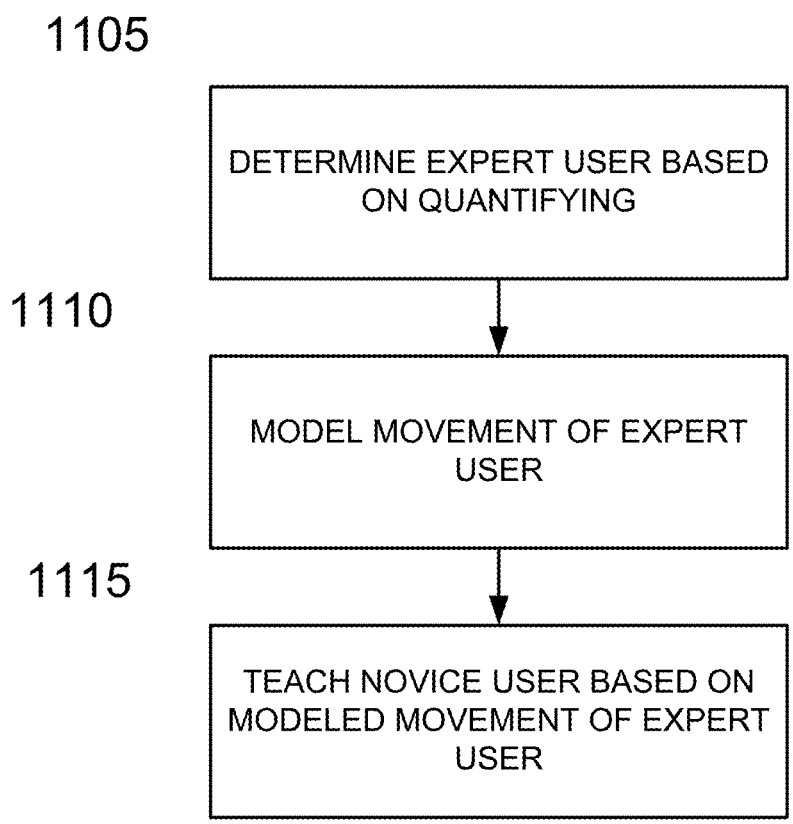

FIG. 11 illustrates a method based on the information learned by the quantifying skill application 130 of teaching a user how to perform a surgical task with more proficiency, according to one embodiment. In 1105, information about how an expert surgeon performs a procedure or task (e.g., at the surgeme or dexeme level) is learned by comparing module 915. In 1110, the movement of the expert surgeon is modeled using modeling module 905. In 1115, a user is taught, using the teaching module 920, the movements of an expert surgeon using the modeled movements found at the expert surgeon level. For example, the user may be shown how his or her movements compare with an expert's movements by viewing analysis data as illustrated by the various embodiments described herein. In another embodiment, either a single expert's motions or a composite of expert motions may be "played back" (with or without associated video) via a powered master manipulator, so that a novice may lightly grasp the manipulator and follow along to kinesthetically experience how the expert moves. Similarly, a simulated motion of an expert's tool can be displayed in the surgeon's console to allow the novice to follow along by moving a simulated or real tool to mimic the expert's tool motion. If one or more surgemes or dexemes are identified as particularly difficult to learn, such surgemes or dexemes can be repeatedly played back to the novice and or monitored as the novice practices the movements until a skill level assessment comparable to the expert's is achieved. And, novice surgeons are motivated to achieve assessment level scores comparable to an expert's. Particular tasks, surgemes, and/or dexemes can be identified for each trainee to practice and master, and the analysis features in accordance with aspects of this invention allow the trainee to quickly assess performance.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A system for quantifying clinical skill of at least one user, comprising:
   at least one application operable on at least one computer, the at least one application configured for:
   collecting data relating to at least one surgical task done by at least one user using at least one surgical device;
   segmenting the data into plural surgemes and plural dexemes, the segmenting comprising normalizing the data and projecting it to a lower dimension using linear discrimination analysis;
   comparing segmented data for the at least one surgical task to other segmented data for at least one other similar surgical task;
   quantifying the clinical skill of the at least one user based on the comparing of the data for the at least one surgical task to the other data for the at least one other similar surgical task;
   outputting the clinical skill of the at least one user.

2. The system of claim 1, wherein the surgical device is a surgical robot.

3. The system of claim 1, wherein the data is video data, motion data, or any combination thereof.

4. The system of claim 1, wherein the at least one application is further configured for:
   determining at least one expert user based on the comparing;
   modeling at least one movement of the at least one expert;
   teaching at least one novice user based on the at least one modeled movement of the at least one expert.

5. The system of claim 4, wherein the teaching can take place without any human supervisor.

6. The system of claim 4, wherein the teaching further comprises:
   guiding at least one movement of the at least one novice user based on the at least one modeled movement of the at least one expert.

7. The system of claim 1, wherein the at least one application is further configured for:
   annotating the at least one surgical task as being at a novice level, and intermediate level, or an expert level.

8. The system of claim 1, wherein the level of clinical expertise of the at least one user is distinguished using comparisons of various underlying models.

9. The system of claim 1, where any task where skill is developed under physical movement can be quantified.

10. The system of claim 1, wherein the at least one application is further configured for:
    collecting data indicating how at least one skilled user performs at least one surgical task;
    collecting data indicating how at least one other user performs the at least one surgical task; and comparing the collected data for the at least one skilled user to the collected data for the at least one other user to determine the clinical skill level of the at least one other user;

outputting the clinical skill level of the at least one other user.

11. The system of claim 10, wherein the at least one surgical task is:

at least one surgical trial;
at least one surgeme of the at least one surgical trial; or
at least one dexeme of the at least one surgeme.

* * * * *